United States Patent
Batra et al.

(10) Patent No.: US 9,501,778 B2
(45) Date of Patent: Nov. 22, 2016

(54) DELIVERING PERSONALIZED RECOMMENDATIONS THAT RELATE TO TRANSACTIONS ON DISPLAY

(75) Inventors: Vishal S. Batra, Noida (IN); Prasad M. Deshpande, Mumbai (IN); Sachin Gupta, New Delhi (IN); Mukesh K. Mohania, Agra (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 13/462,658

(22) Filed: May 2, 2012

(65) Prior Publication Data

US 2013/0297412 A1    Nov. 7, 2013

(51) Int. Cl.
| | | |
|---|---|---|
| G06Q 30/00 | (2012.01) | |
| G06Q 30/02 | (2012.01) | |
| G06F 17/30 | (2006.01) | |

(52) U.S. Cl.
CPC .............. *G06Q 30/02* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 7,370,004 B1 | 5/2008 | Patel et al. | |
| 7,630,986 B1* | 12/2009 | Herz et al. | |
| 7,921,042 B2* | 4/2011 | Jacobi et al. | 705/26.7 |
| 2002/0069119 A1* | 6/2002 | Rogatinsky | 705/26 |
| 2003/0061132 A1 | 3/2003 | Yu, Sr. et al. | |
| 2003/0172014 A1 | 9/2003 | Quackenbush et al. | |
| 2008/0033821 A1* | 2/2008 | Jacobi et al. | 705/14 |
| 2008/0208786 A1 | 8/2008 | Serrano-Morales et al. | |
| 2009/0254971 A1* | 10/2009 | Herz et al. | 726/1 |
| 2009/0276368 A1 | 11/2009 | Martin et al. | |
| 2010/0076895 A1 | 3/2010 | Spencer et al. | |
| 2010/0094697 A1 | 4/2010 | Cavanaugh | |
| 2011/0179081 A1* | 7/2011 | Ovsjanikov et al. | 707/780 |
| 2011/0270779 A1 | 11/2011 | Showalter | |
| 2012/0016678 A1* | 1/2012 | Gruber et al. | 704/275 |
| 2012/0084348 A1* | 4/2012 | Lee | G06Q 30/02 709/203 |
| 2012/0102053 A1* | 4/2012 | Barrett | G06F 17/30592 707/754 |
| 2012/0116868 A1* | 5/2012 | Chin | G06Q 30/0203 705/14.43 |
| 2013/0024267 A1* | 1/2013 | Libenson | G06Q 30/02 705/14.38 |

OTHER PUBLICATIONS

Hsu, Cheng. "Hyper-networking of customers, providers, and resources drives new service business designs: E-commerce and beyond." Service Science 3.4 (2011): 325-337.*

Quadrant, Magic. "Magic quadrant for mobile device management software." (2011).*

(Continued)

*Primary Examiner* — Gurkanwaljit Singh
(74) *Attorney, Agent, or Firm* — Janaki K. Davda; Konrad, Raynes, Davda & Victor LLP

(57) ABSTRACT

Provided are techniques for providing personalized recommendations. One or more transactions are received from one or more customer interaction channels. The received one or more transactions are stored in an incremental data store. One or more predictive rules are generated based on the received one or more transactions and based on one or more transactions previously stored in the incremental data store. In real-time, one or more personalized recommendations specific to a user and to the received one or more transactions are generated using the one or more generated predictive rules.

15 Claims, 14 Drawing Sheets

(56) References Cited

OTHER PUBLICATIONS

Zwass, Vladimir. "The Framework and the Big Ideas of e-Business." Handbook of Strategic e-Business Management. Springer Berlin Heidelberg, 2014. 3-14.*

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Westerfeld, S. and H. Zimmermann, "E-Business Tools for Active Credit Risk Management—A Market Analysis", Proceedings of the 41st Hawaii International Conference on System Sciences—2008, © 2008 IEEE, Total 10 pp. (available at: http://csdl2.computer.org/comp/proceedings/hicss/2008/3075/00/30750301.pdf).

* cited by examiner

Micro-Analytics Workbench for Retail Banking

600

- Projects
  - Capital Leakage Prevention
    - Housing Loan
    - Car Loan
  - Cross Sell
  - Up Sell

Rule Definition

Applicable Channels: ☐ Net Banking ☐ ATM ☐ Phone Banking ☐ SMS

Account Type: ☐ Current ☐ Savings ☐ Salary

Account No: [ ] (, separated)

Zone: [All ▼]

Transaction Type: [Withdrawal ▼]

Transaction Value Filter: [More than ▼] [30000]

Transaction Narration:
- Starts With: [ECS]
- Contains: [LIC Housing OR ICICI Ba] (use OR)
- Ends With: [ ]
- Condition: [All ▼]

AQB: [More than ▼] [ ]

Recommendation:
- Start Date (mm/dd/yyyy): [ ]  End Date (mm/dd/yyyy): [ ]
- [Transfer Loan at 0.5% L]  [External Program]
- [ILOG Rule]  [MNO Model]
- [housingloantransfer.jsp]

Landing Page:

Lead Alert: [vibatra1@in.ibm.com]  [SMS]

[Save Rule]

FIG. 6

DELIVERING PERSONALIZED RECOMMENDATIONS THAT RELATE TO TRANSACTIONS ON DISPLAY

FIELD

Embodiments of the invention relate to delivering personalized recommendations that relate to transactions on display.

BACKGROUND

Companies today use analytics to provide offers, etc. that target a specific audience or individual. Analytics may be described as using statistics to solve problems in business. Analytics may also be described as analyzing data (using mathematics/statistics) to predict what offers, etc. should be provided to a particular target. Thus, analytics provides recommendations based on insights derived through the application of statistical models and analysis against data.

Existing systems for analytics are tightly coupled with backend systems, such as data warehouses, for data and learning dependency. Therefore, solution development, integration and deployment may be slow and expensive. A data warehouse may be described as a database used for reporting and analysis.

FIG. 1 illustrates a prior art offline analytics environment 100. In FIG. 1, three transaction channels provide input to a transaction management system. A transaction channel may be described as a pathway for a transaction to reach the transaction management system. For example, a bank may have a transaction channel through which banking transactions are routed to the transaction management system. The transaction management system saves transactions in a transaction database and in a data warehouse. The data warehouse may be realized using a database. The analytics processes the transactions in the data warehouse to provide offers, etc. to be used in marketing campaigns.

FIG. 2 illustrates a prior art inline analytics environment 200. In FIG. 2, three transaction channels provide input to a transaction management system. The transaction management system includes recommendation rules (both static and predictive rules) that are saved in a rules database. Static rules may be described as rules that are pre-defined by business users/humans, and predictive rules may be described as rules that are automatically generated (i.e., learnt or discovered) from data. The transaction management system saves transactions in the transaction database and the data warehouse. The analytics processes the transactions in the data warehouse using the rules to provide offers etc. to be used in marketing campaigns The analytics may depend on confidential data (e.g., banking transactions). Also, the rules and recommendations may be at a segment-level (i.e., directed towards a segment of the population).

SUMMARY

Provided are a method, computer program product, and system for providing personalized recommendations. One or more transactions are received from one or more customer interaction channels. The received one or more transactions are stored in an incremental data store. One or more predictive rules are generated based on the received one or more transactions and based on one or more transactions previously stored in the incremental data store. In real-time, one or more personalized recommendations specific to a user and to the received one or more transactions are generated using the one or more generated predictive rules.

BRIEF DESCRIPTION OF THE SEVERAL VIEWS OF THE DRAWINGS

Referring now to the drawings in which like reference numbers represent corresponding parts throughout:

FIG. 6 illustrates an example user interface provided by a rules management workbench in accordance with certain embodiments.
FIG. 10 is formed by FIG. 10A and FIG. 10B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide personalized recommendations (e.g., offers, advertisements, etc.) that are relate to transactions on display. Also, embodiments scale for personalized rules and recommendations. Embodiments define analytics scenarios at individual customer level to deliver personalized recommendations and scale to deploy analytics scenarios for individual customers.

Figure 1:
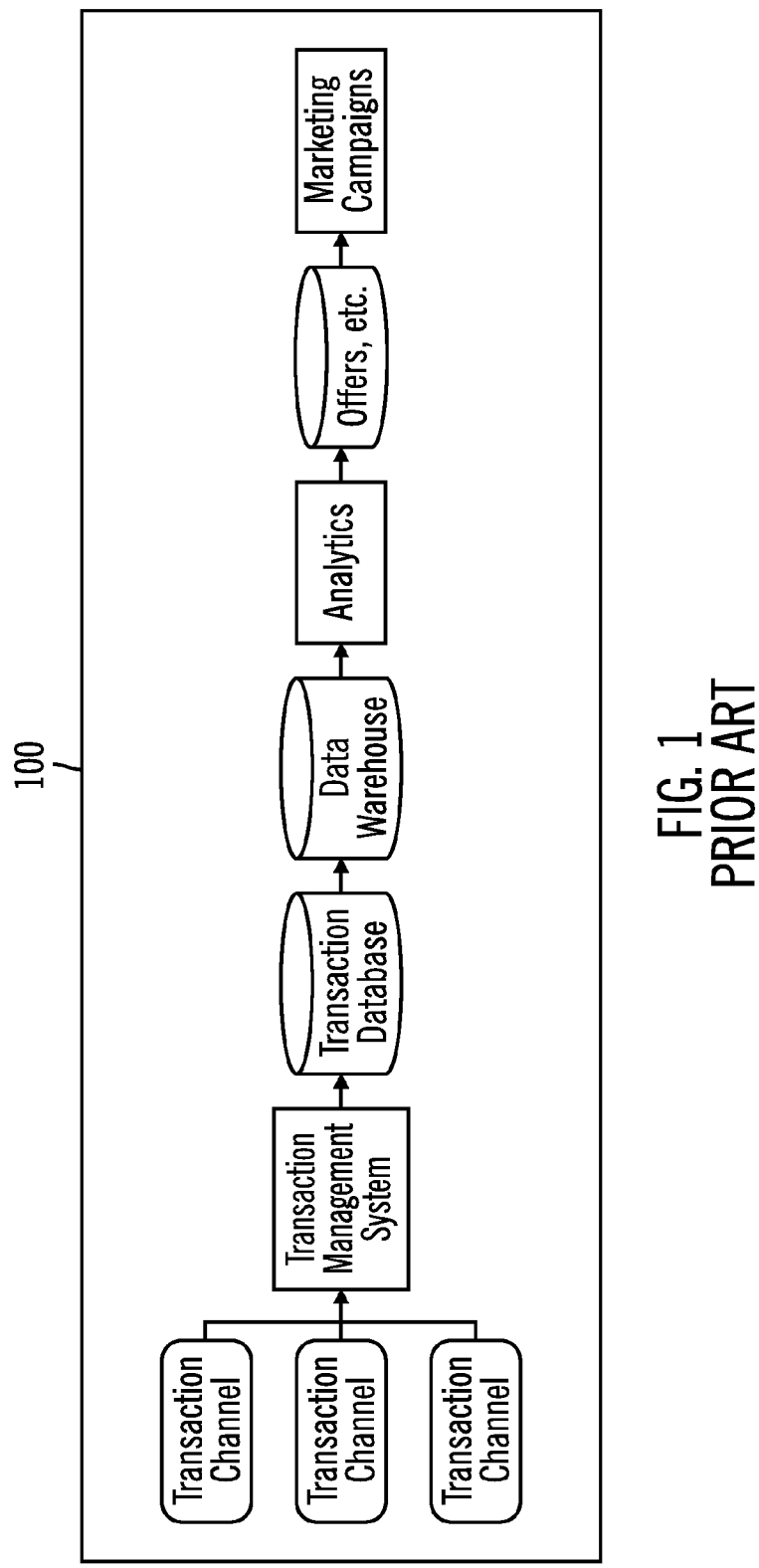
FIG. 1 illustrates a prior art offline analytics environment.
Figure 2:
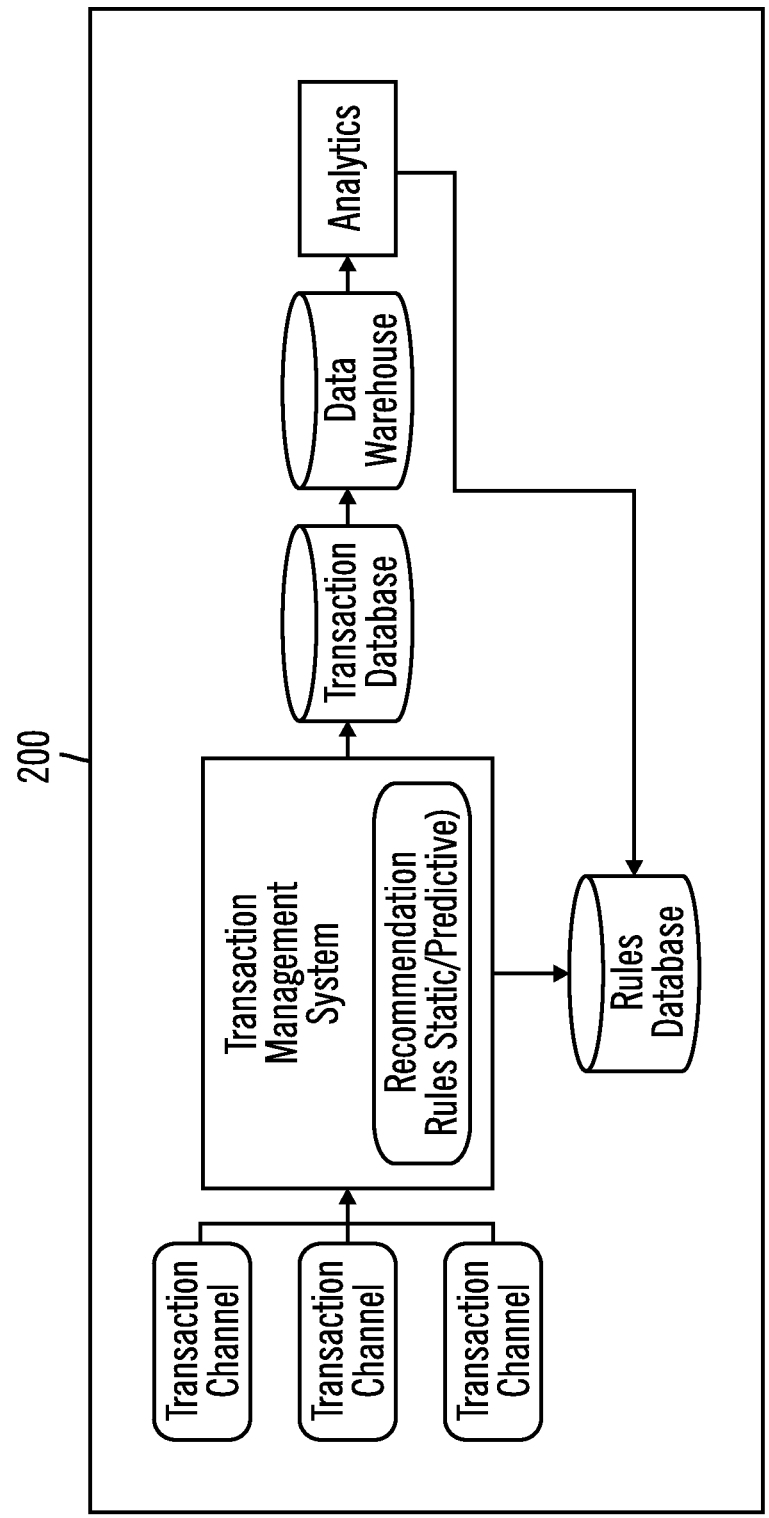
FIG. 2 illustrates a prior art inline analytics environment.
Figure 3:
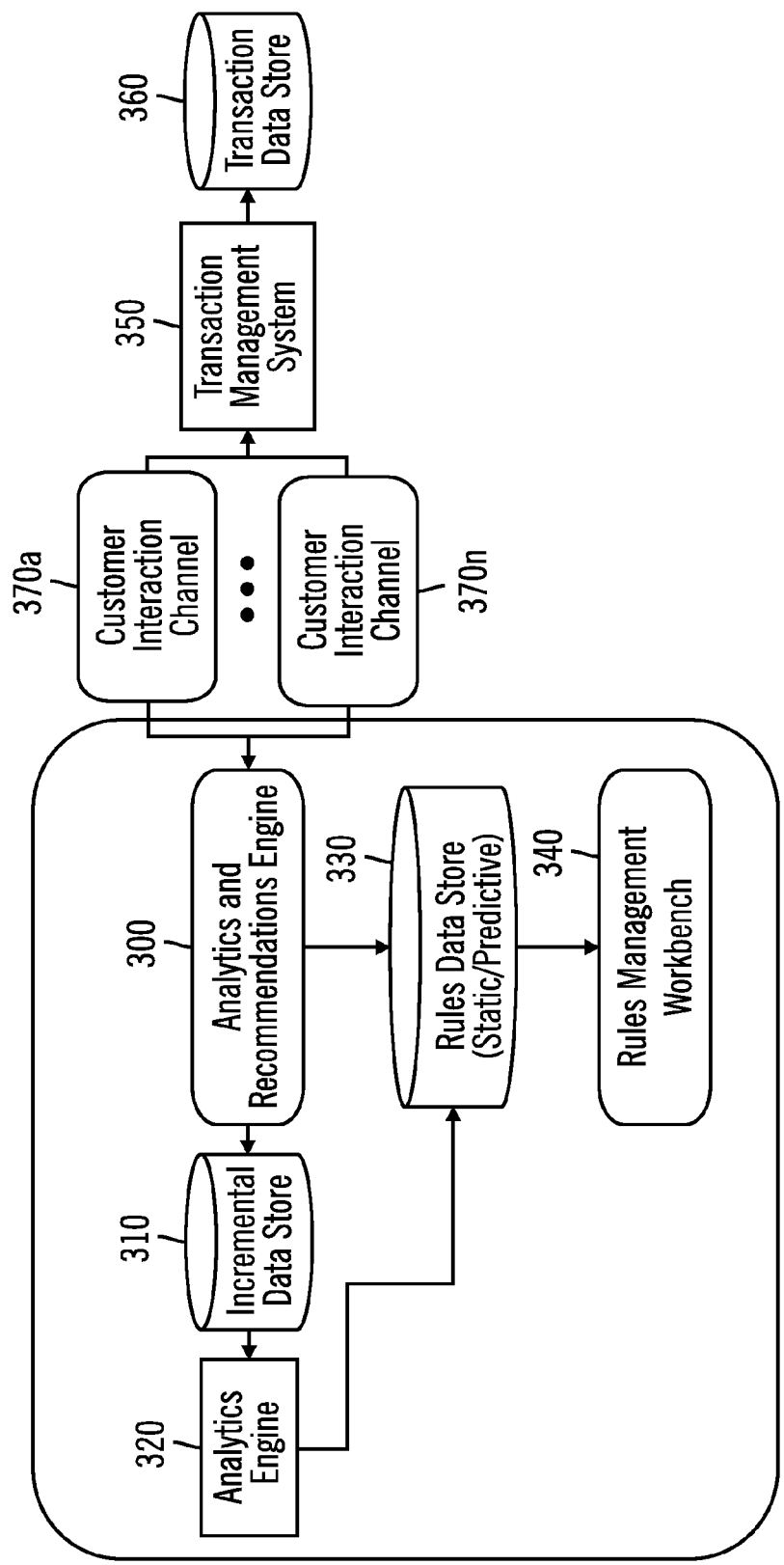
FIG. 3 illustrates a computing environment in accordance with certain embodiments.

FIG. 3 illustrates a computing environment in accordance with certain embodiments. In FIG. 3, an Analytics and Recommendations (AR) engine 300 is coupled to customer interaction channels 370a . . . 370n. The customer interaction channels 370a . . . 370n are also coupled to a transaction management system 350, which is coupled to a transaction data store 360. Thus, the AR engine 300 and the transaction management system 350 may pass information to each other via the customer interaction channels 370a . . . 370n. In certain embodiments, the transaction management system 350 provides transactions to the AR engine 300 via the customer interaction channels 370a . . . 370n. In certain embodiments, the AR engine 300 provides personalized recommendations to the transaction management system 350 via the customer interaction channels 370a . . . 370n. The transaction management system 350 may be any type of system that manages transactions (e.g., a bank, a retailer, etc.). In certain embodiments, a customer interaction channel 370a . . . 370n may be a net banking portal, Short Message Service (SMS) portal, a browser, an Automated Teller Machine (ATM) portal, etc. The customer interaction channels 370a . . . 370n may also be referred to as customer interaction channels.

The AR engine 300 stores the transactions in the incremental data store 310. The transactions in the data store 310 grow incrementally as more transactions are stored. The transactions represent historical information. The analytics engine 320 generates predictive rules (i.e., provides predictions) based on the transactions in the data store 310. For example, the analytics engine 320 may generate a predictive rule to indicate that customer A, who has a mortgage loan, may want to transfer the mortgage loan. As another example, if a user has taken a housing loan, the analytics engine 320 may generate a predictive rule that the user might also need home insurance coverage. The analytics engine 320 stores the predictions in the rules data store 330. The rules data store 330 stores static rules and predictive rules. In certain embodiments, these static and predictive rules may be referred to as recommendation rules. A rules management workbench 340 provides a user interface to enable a user to create and manage rules that are stored in the rules data store 330. The AR engine 300 uses the rules and the predictions stored in the rules data store 330 to make personalized recommendations specific to the user and to the transactions being displayed to the user in real time.

Thus, embodiments leverage information on the customer interaction channels (instead of backend systems and data stores) to define and apply rules and predictions to deliver personalized recommendations specific to the user ant to the transactions on display for the user.

In certain embodiments, the AR engine 300 offers a service of providing personalized recommendations.

In certain embodiments, there is no dependency or integration needed with backend systems, such as data warehouses. Instead, embodiments use micro-feeds from the customer interaction channels to analyze the recent transactions and deliver personalized recommendations.

Embodiments provide real time feedback and an optimization loop. In particular, embodiments provide a real time feedback and interaction loop with customers and use the feedback to re-analyze, optimize, and further personalize recommendations. That is, when a user is provided with personalized recommendations, if the user selects a particular offer, this information may be used to generate more personalized recommendations.

Embodiments provide cross-channel analytics and recommendations. For example, insights gained from information and feedback captured from a net banking customer interaction channel may also be used to deliver recommendations on an alternate customer interaction channel, such as ATM or SMS.

Figure 4:
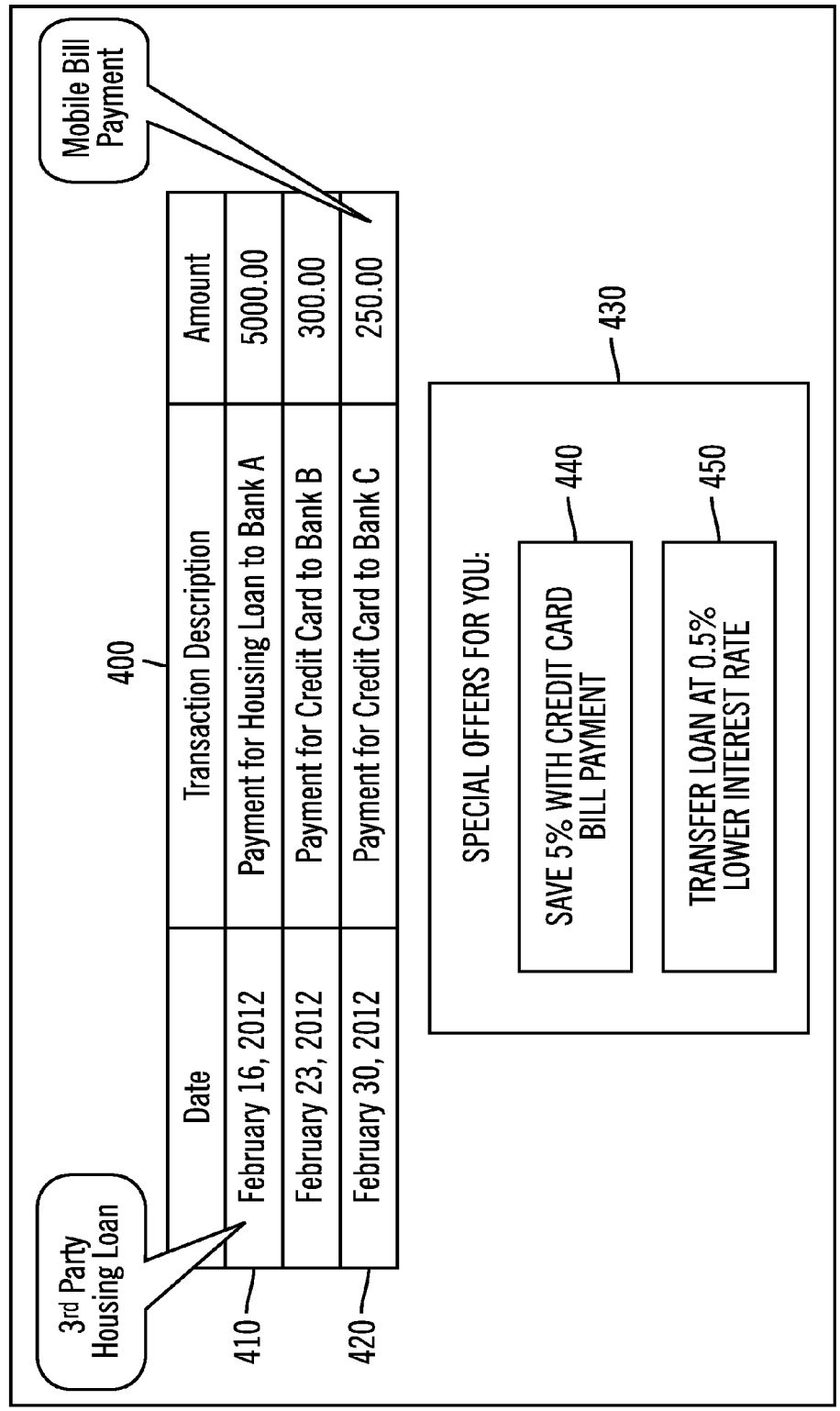
FIG. 4 illustrates an example of personalized recommendations for a banking sector in accordance with certain embodiments.

FIG. 4 illustrates an example of personalized recommendations for a banking sector in accordance with certain embodiments. Table 400 stores banking transactions for Bank C. For each banking transaction, a date, a transaction description, and an amount is stored. In certain embodiments, additional columns for other information may be included in table 400. Row 410 in table 400 is for a payment for a third ($3^{rd}$) party housing loan. Row 420 in table 400 is for a mobile bill payment for a credit card issued by Bank C. In the example of FIG. 4, the AR engine 300 provides suggestions of special offers 430. In particular, because there is a transaction of payment for a credit card to Bank C (row 420), the AR engine 300 provides a suggested offer 440 of to save 5% with a credit card payment. Also, because there is a transaction of a payment to another bank (Bank A) for a housing loan, the AR engine 300 provides a suggested offer 450 to transfer a loan at 0.5% lower interest rate.

Figure 5:
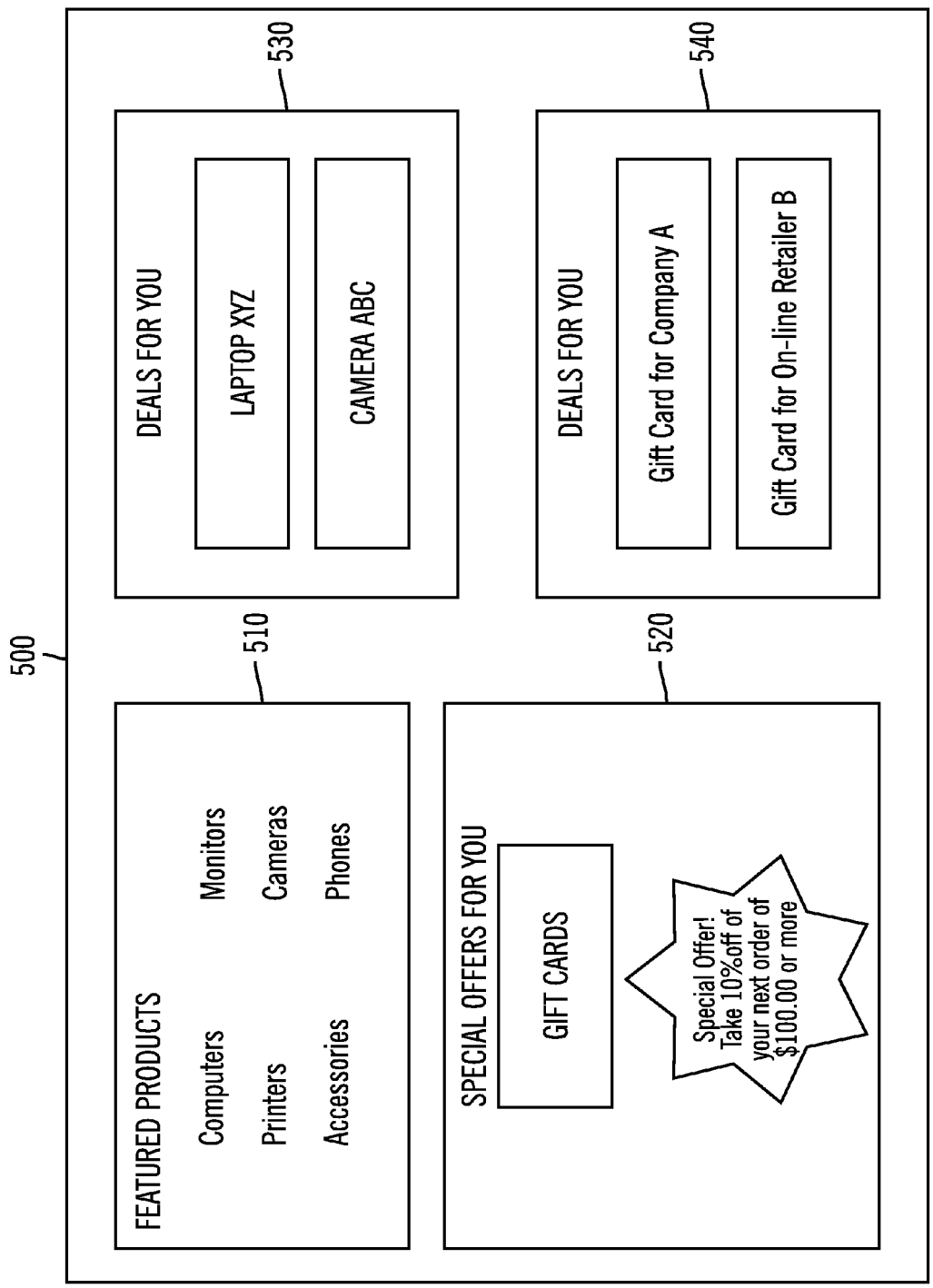
FIG. 5 illustrates an example of offers provides by an on-line retailer in accordance with certain embodiments.

FIG. 5 illustrates an example of offers provides by an on-line retailer in accordance with certain embodiments. In FIG. 5, a web site 500 is displayed. Featured products 500 are displayed. Also, the AR engine 300 provides recommendations on special offers 520. Then, deals 530 and gift cards 540 are displayed for the user, along with the featured products 510.

FIG. 6 illustrates an example user interface 600 provided by the rules management workbench 340 in accordance with certain embodiments. The user interface 600 allows a user to create rules. In the example illustrated in FIG. 6, a rule is created for a transaction type of "Withdraw", where the transaction value filter is set at more than 30,000 and is for a housing loan. For such a transaction, the recommendation is to offer a transfer loan.

Figure 7:
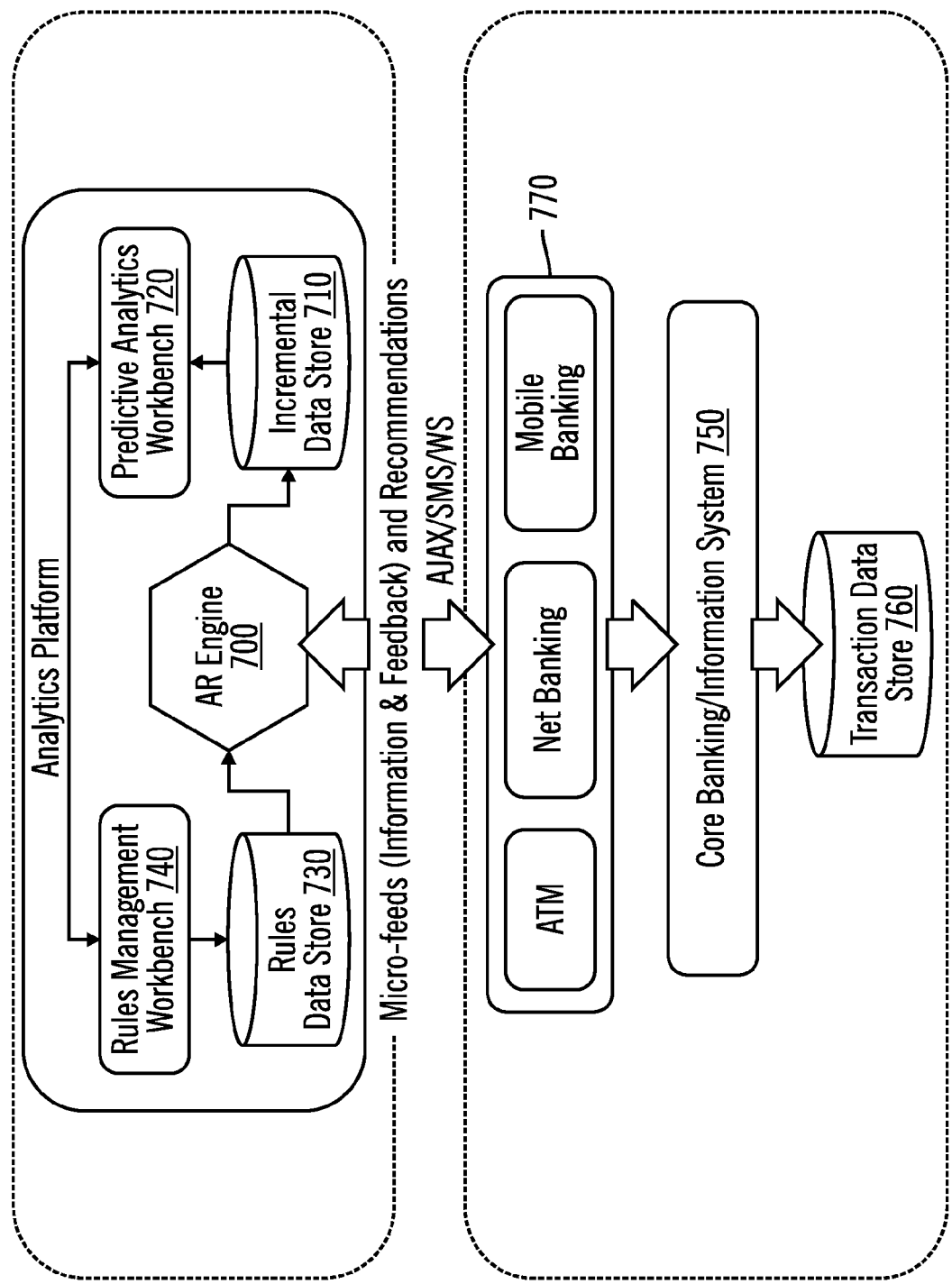
FIG. 7 illustrates another computing environment in accordance with certain embodiments.

FIG. 7 illustrates another computing environment in accordance with certain embodiments. In FIG. 7, an Analytics and Recommendations (AR) engine 700 is coupled to customer interaction channels 770. The customer interaction channels 770 are also coupled to a core banking/information system 750 (i.e., an example of a transaction management system), which is coupled to a transaction data store 760. Thus, the AR engine 700 and the core banking/information system 750 may pass information to each other via the customer interaction channels 770. In certain embodiments, the core banking/information system 750 provides transactions to the AR engine 700 via the customer interaction channels 770. In certain embodiments, the AR engine 700 provides personalized recommendations (e.g., offers, advertisements, etc.) to the core banking/information system 750 via the customer interaction channels 770. In the example of FIG. 7, the customer interaction channels include an ATM portal, a net banking portal, and a mobile banking portal. In certain embodiments, micro-feeds (information and feedback) and recommendations are sent between the AR engine 700 and the core banking/information system 750 using Asynchronous JavaScript and XML (AJAX) (where XML is Extensible Mark-Up Language), SMS and/or Web Service (WS) WS may be described as a software channel through which information may be sent between the AR engine 700 and the core banking/information system 750. (JavaScript is a trademark or registered trademark of Oracle and/or its affiliates.)

The AR engine 700 stores the transactions in the incremental data store 710. The analytics engine 720 provides predictions based on the transactions in the incremental data store 710. The analytics engine 720 routes the predictions to the rules management workbench 340. The rules and predictions data store 730 stores static rules and predictive rules. A rules management workbench 740 provides a user interface to enable a user to create and manage rules that are stored in the rules and predictions data store 730. The AR engine 700 uses the rules and the predictions stored in the rules and predictions data store 730 to make personalized recommendations specific to the user and to the transactions being displayed to the user in real time.

Figure 8:
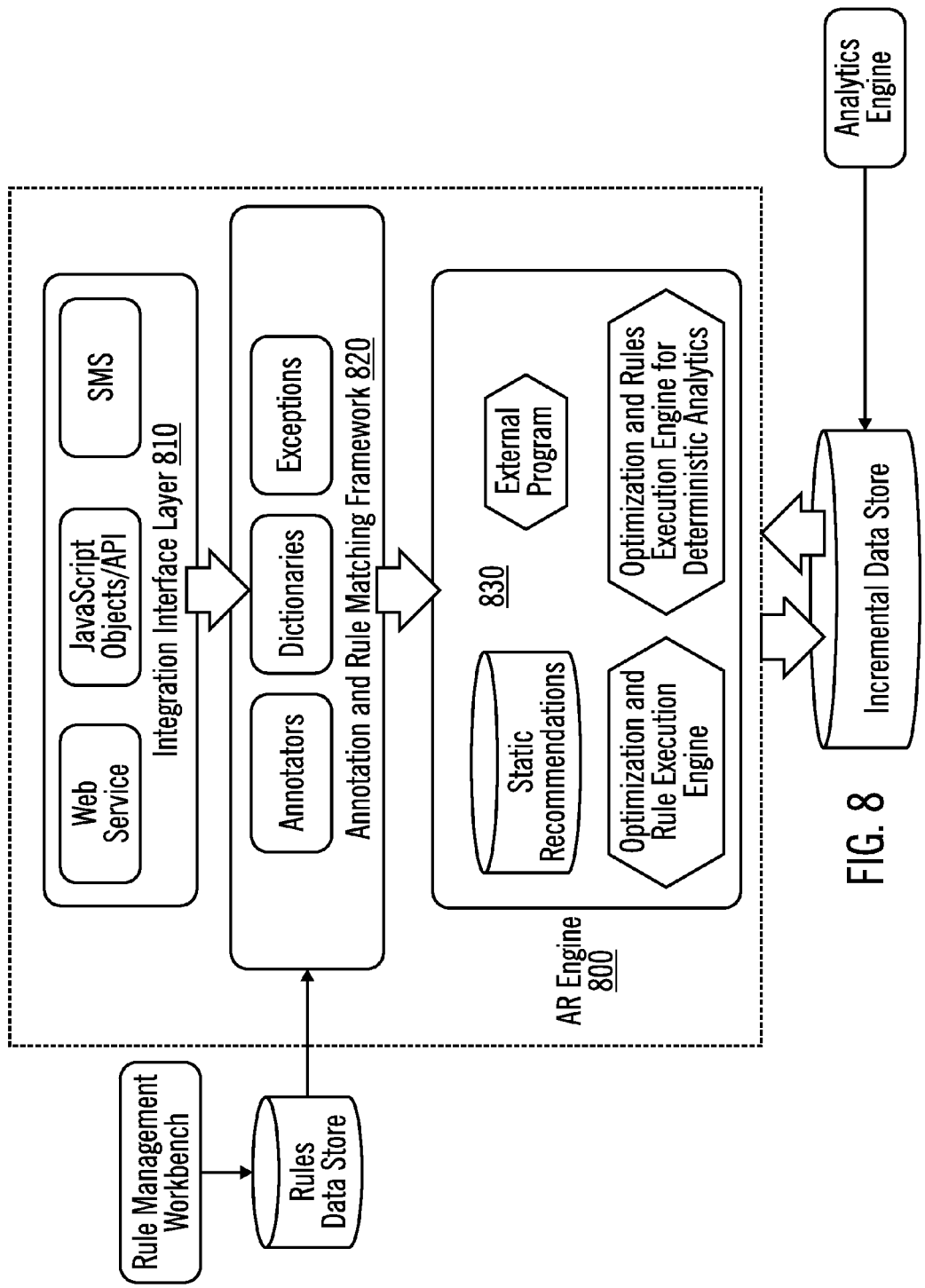
FIG. 8 illustrates further details of an Analytics and Recommendations (AR) Engine in accordance with certain embodiments.

FIG. 8 illustrates further details of an Analytics and Recommendations (AR) Engine 800 in accordance with certain embodiments. The AR engine 800 includes an integration interface layer 810, an annotation and rule matching framework 820, and other elements 830. The integration interface layer 810 includes a web service component, a JavaScript objects/Application Programming Interfaces (API) component, and an SMS component. The annotation and rule matching framework 820 includes annotators, dictionaries, and exceptions. In certain embodiments, the annotation and rule matching framework 820 uses data mining techniques (e.g., pattern matching and text mining) to match similar transaction descriptions along with other structured transaction details (e.g., amount, type (deposit/withdrawal), date, etc.) to run the rule. The annotation and rule matching framework 820 allows complex rules to be defined that are matched against a group of transactions, temporal rules and events, and negative rules and events (e.g., this rule triggers when a certain transaction/data is not present on the customer interaction channel). The other elements 830 include static recommendations, an external program, an optimization and rule execution engine, and an optimization and rules execution engine for deterministic analytics (for pre-defined static rules). In FIG. 8, the analytics engine discovers dynamic patterns and rules.

Figure 9:
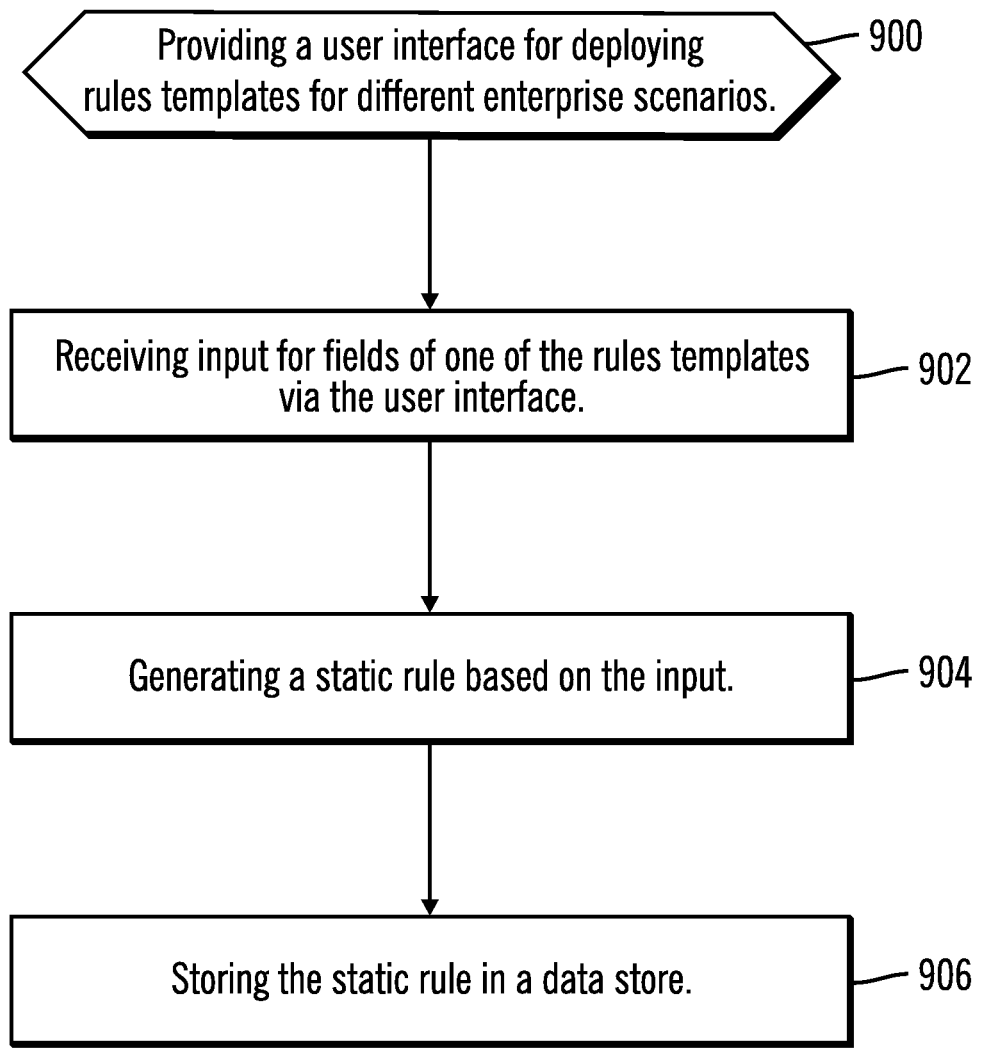
FIG. 9 illustrates, in a flow diagram, operations for creating rules in accordance with certain embodiments.

FIG. 9 illustrates, in a flow diagram, operations for creating rules in accordance with certain embodiments. Control begins at block 900 with the rules management workbench 340 providing a user interface for deploying rules templates for different enterprise scenarios. In block 902, the rules management workbench 340 receives input for fields of one of the rules templates via the user interface. In block 904, the rules management workbench 340 generates a static rule based on the input. In block 906, the rules management workbench 340 stores the static rule in the data store 330.

In certain embodiments, there are rules templates for, but not limited to, capital leakage prevention for housing loans and for investment in money/capital markets. In certain embodiments, each rules templates has one or more fields into which a user may enter data.

Figure 10A:
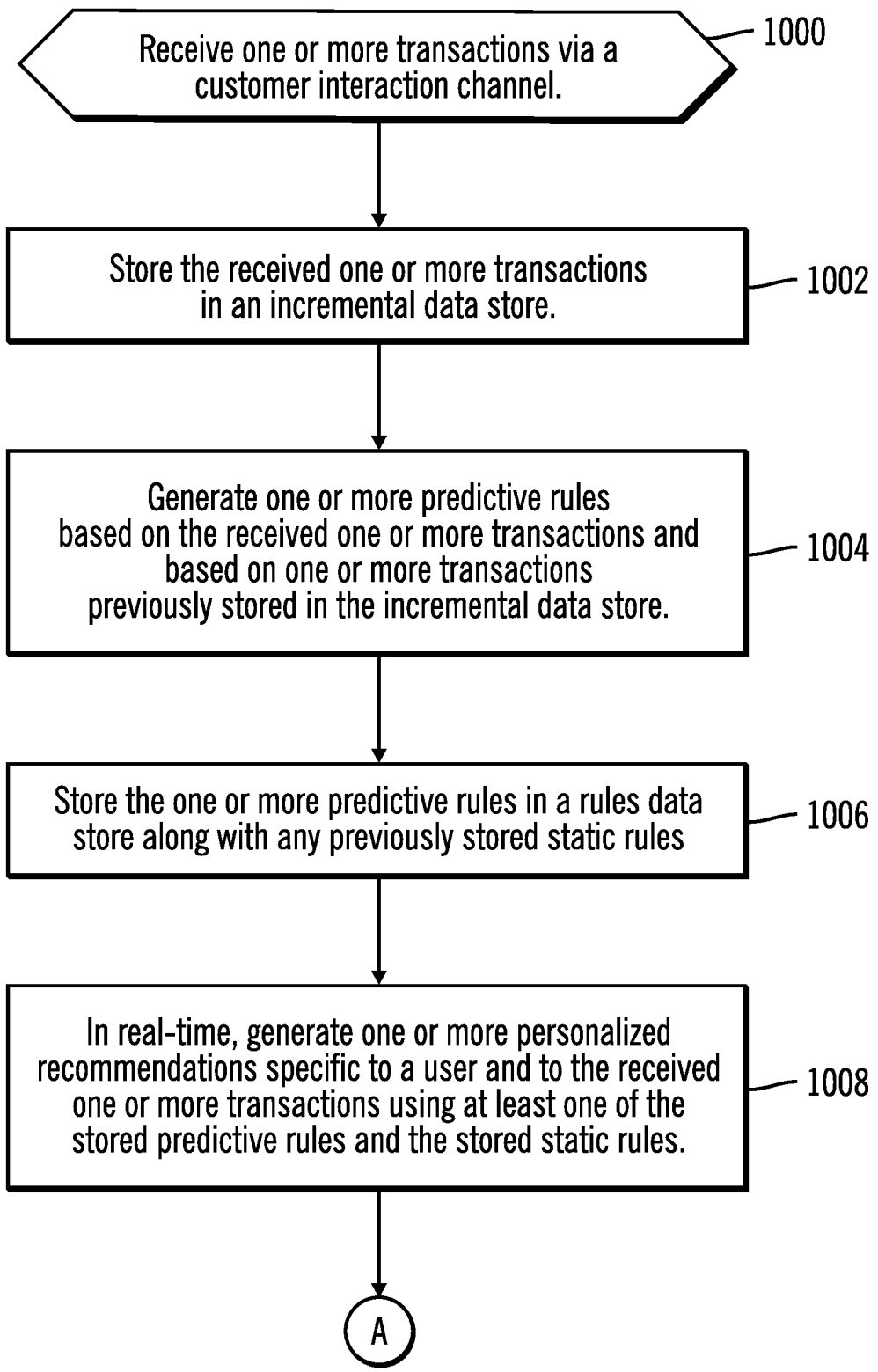
FIG. 10 illustrates, in a flow diagram, operations for providing personalized recommendations in accordance with certain embodiments.
Figure 10B:
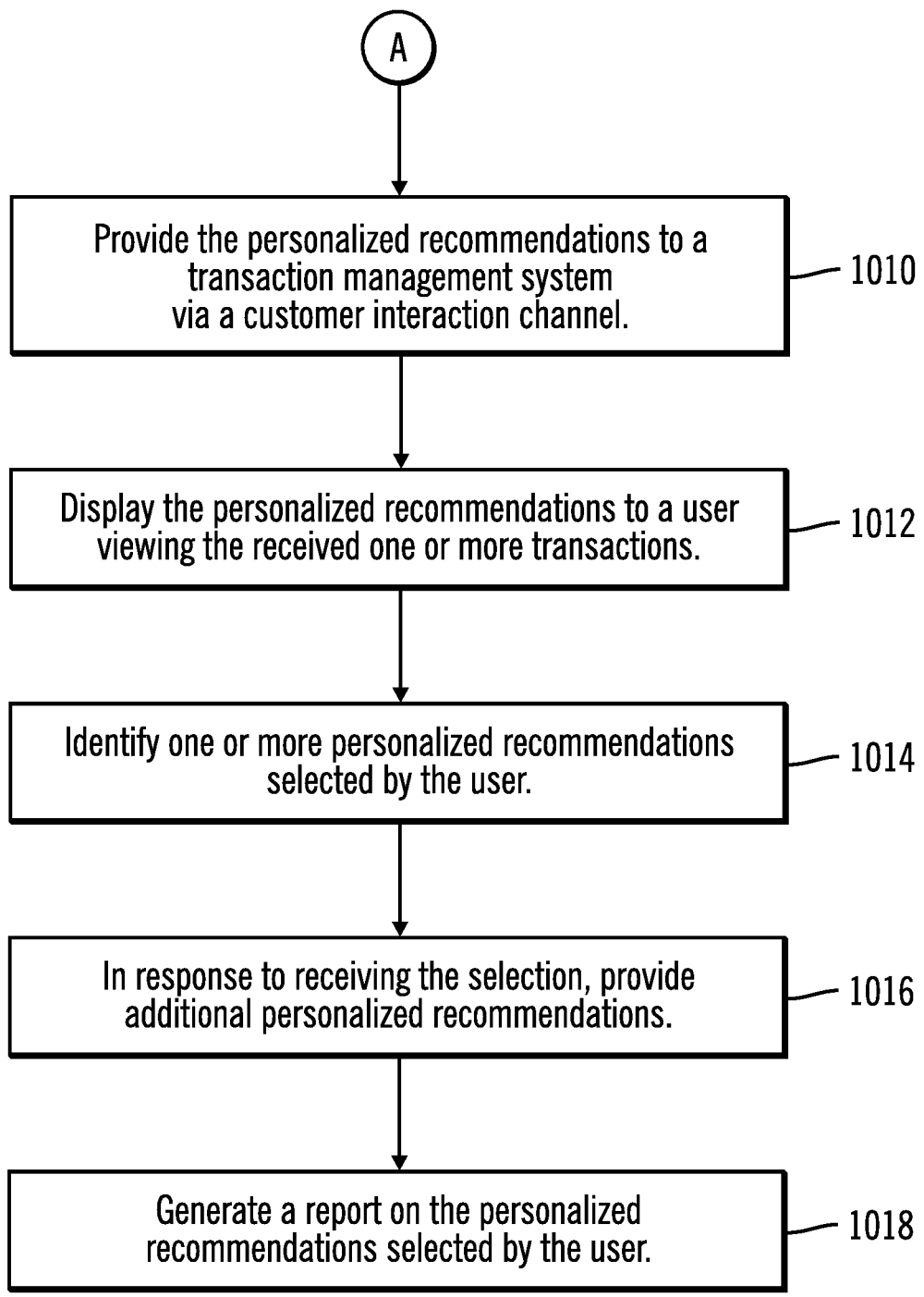

FIG. 10 illustrates, in a flow diagram, operations for providing personalized recommendations in accordance with certain embodiments. FIG. 10 is formed by FIG. 10A and FIG. 10B. Control beings at block 1000 with the AR engine 300 receiving one or more transactions via a customer interaction channel 370a . . . 370n. In certain embodiments, the AR engine 300 obtains (e.g., pulls) the one or more transactions from the customer interaction channels 370a . . . 370n. In block 1002, the AR engine 300 stores the received one or more transactions in an incremental data store 310. In block 1004, the analytics engine 320 generates one or more predictive rules based on the received one or more transactions and based on one or more transactions previously stored in the incremental data store. In block 1006, the analytics engine 320 stores the one or more predictive rules in a rules data store 330, along with any previously stored static rules. That is, the data sore 330 may store predictive and/or static rules at any given time. In block 1008, in real time, the AR engine 300 generates one or more personalized recommendations specific to a user and to the received one or more transactions using at least one of the stored predictive rules and the stored static rules. In certain embodiments, the received one or more transactions are being provided (e.g., displayed) to the user in real-time. From block 1008 (FIG. 10A), processing continues to block 1010 (FIG. 10B). In block 1010, the AR engine 300 provides the personalized recommendations to a transaction management system 350 via a customer interaction channel 370a . . . 370n. In block 1012, the AR engine 300 displays the personalized recommendations to a user viewing the received one or more transactions. In block 1014, the AR engine 300 identifies one or more personalized recommendations selected by the user. In block 1016, in response to receiving the selection, the AR engine 300 provides additional personalized recommendations (e.g., by performing the processing of blocks 1000-1008. In certain embodiments, the AR engine 300 obtains the selections of transactions from the customer interaction channels 370a . . . 370n. In block 1018, the AR engine 300 generates a report on the personalized recommendations selected by the user.

Thus, embodiments develop and deploy rules templates for different enterprise scenarios. Embodiments define rules based on the information on the customer interaction channels. Embodiments deliver personalized recommendations to customers/users the on customer interaction channels. Embodiments define static rules to capture relevant data (e.g., transactions, purchases) incrementally from the customer interaction channels for analysis. Embodiments develop and train predictive models over relevant incremental data for predictive analytics, such as collaborative filtering etc. In certain embodiments, the training is dome by taking the data made available from collaborative filtering and using that data to train predictive models. In certain embodiments, predictive models are predictive rules. Embodiments use predictive models to assist in building more relevant (static) rules in real-time based on the data (transactions/products) present on the customer interaction channels. Embodiments deliver leads to customer care executives on recommendations selected by the customer/user.

Embodiments compute recommendations and personalized offers by defining rules and predictive analytics on transactional data presented over customer interaction channels in near real time by: allowing domain experts to define rule templates and rules based on the information available on the customer interaction channels, such as transactional data available on a net banking web page, ATM, SMS or call center; real time execution of rules and predictive models on the data present on the customer interaction channel to generate relevant/personalized recommendations directly on these channels; and generating (contextual) personalized recommendations matching with the data present on the customer interaction channels.

Embodiments integrate an AR engine 300 with existing customer interaction channels/end-points, such as a net banking web page, ATM, SMS or call center, to collect transactional data, thus eliminating the need for integration with back end systems, such as a data warehouse or transaction systems for collecting and analyzing transactional data.

Embodiments define rules to capture relevant data from customer interaction channels for predictive modeling and analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
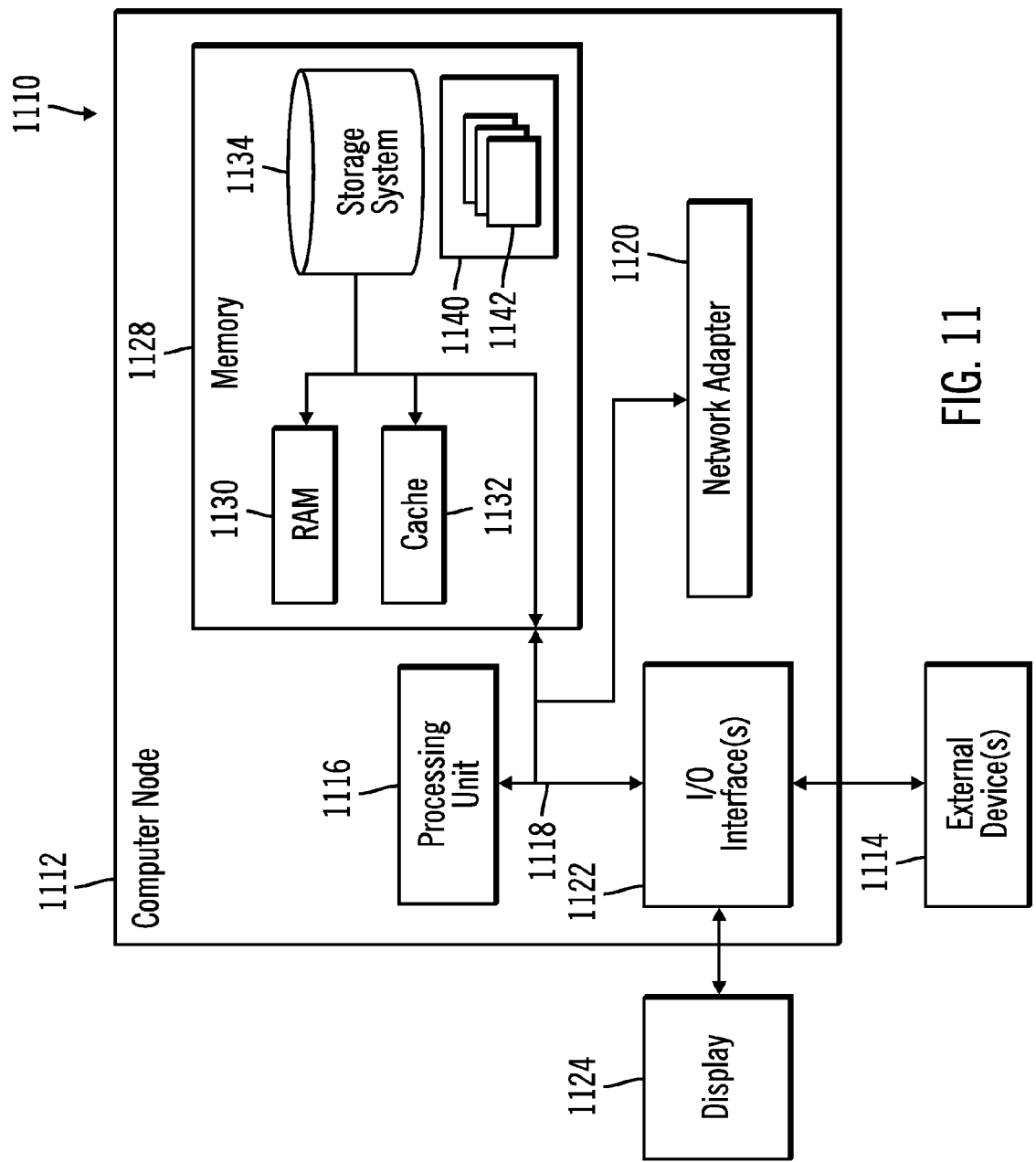
FIG. 11 depicts a cloud computing node in accordance with certain embodiments.

Referring now to FIG. 11, a schematic of an example of a cloud computing node is shown. Cloud computing node 1110 is only one example of a suitable cloud computing node and is not intended to suggest any limitation as to the scope of use or functionality of embodiments of the invention described herein. Regardless, cloud computing node 1110 is capable of being implemented and/or performing any of the functionality set forth hereinabove.

In cloud computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in cloud computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

Figure 12:
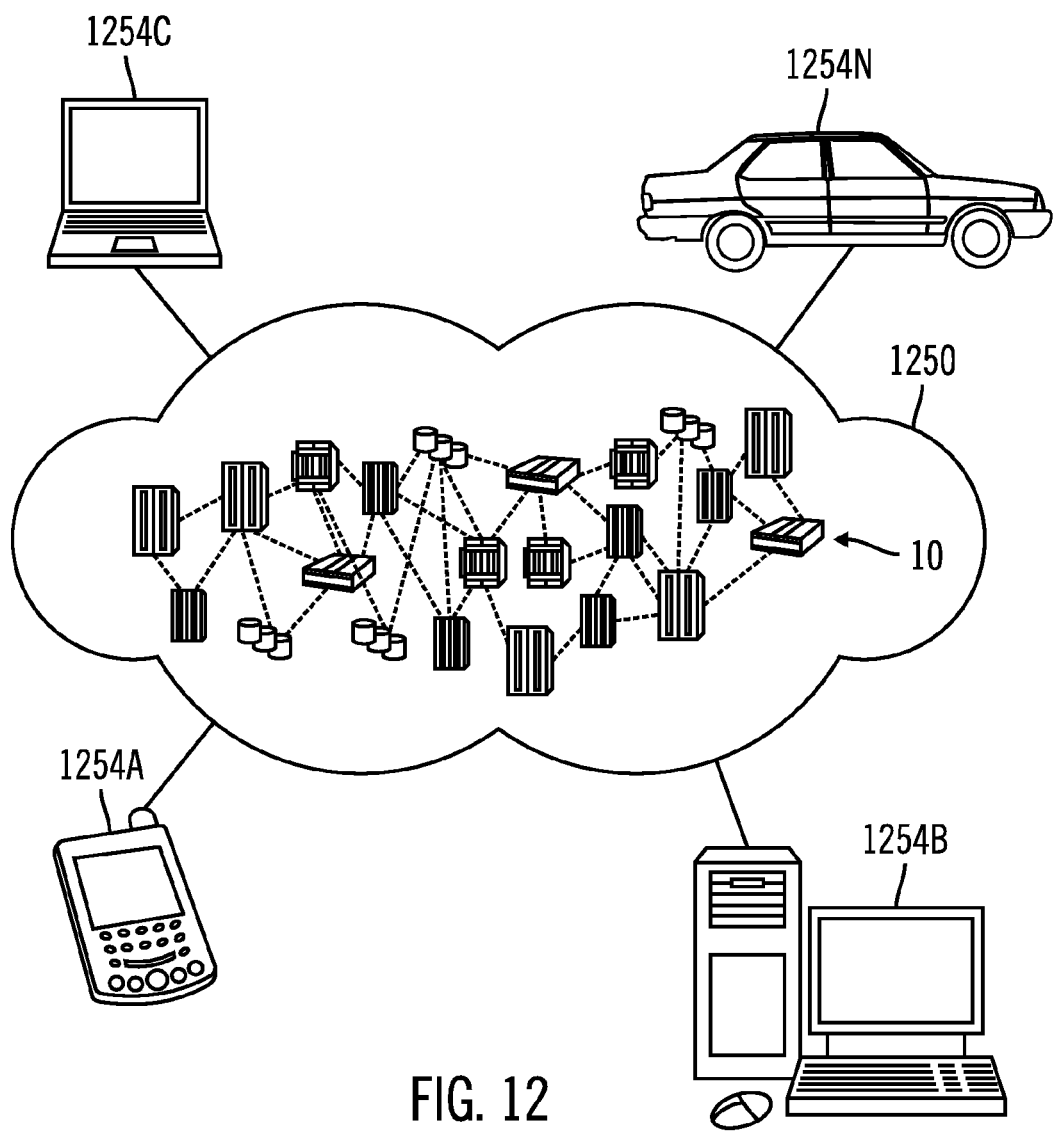
FIG. 12 depicts a cloud computing environment in accordance with certain embodiments.

Referring now to FIG. 12, illustrative cloud computing environment 1250 is depicted. As shown, cloud computing environment 1250 comprises one or more cloud computing nodes 1110 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1110 and cloud computing environment 1250 can communicate with any type of computerized device over any type of network and/or network addressable connection (e.g., using a web browser).

Figure 13:
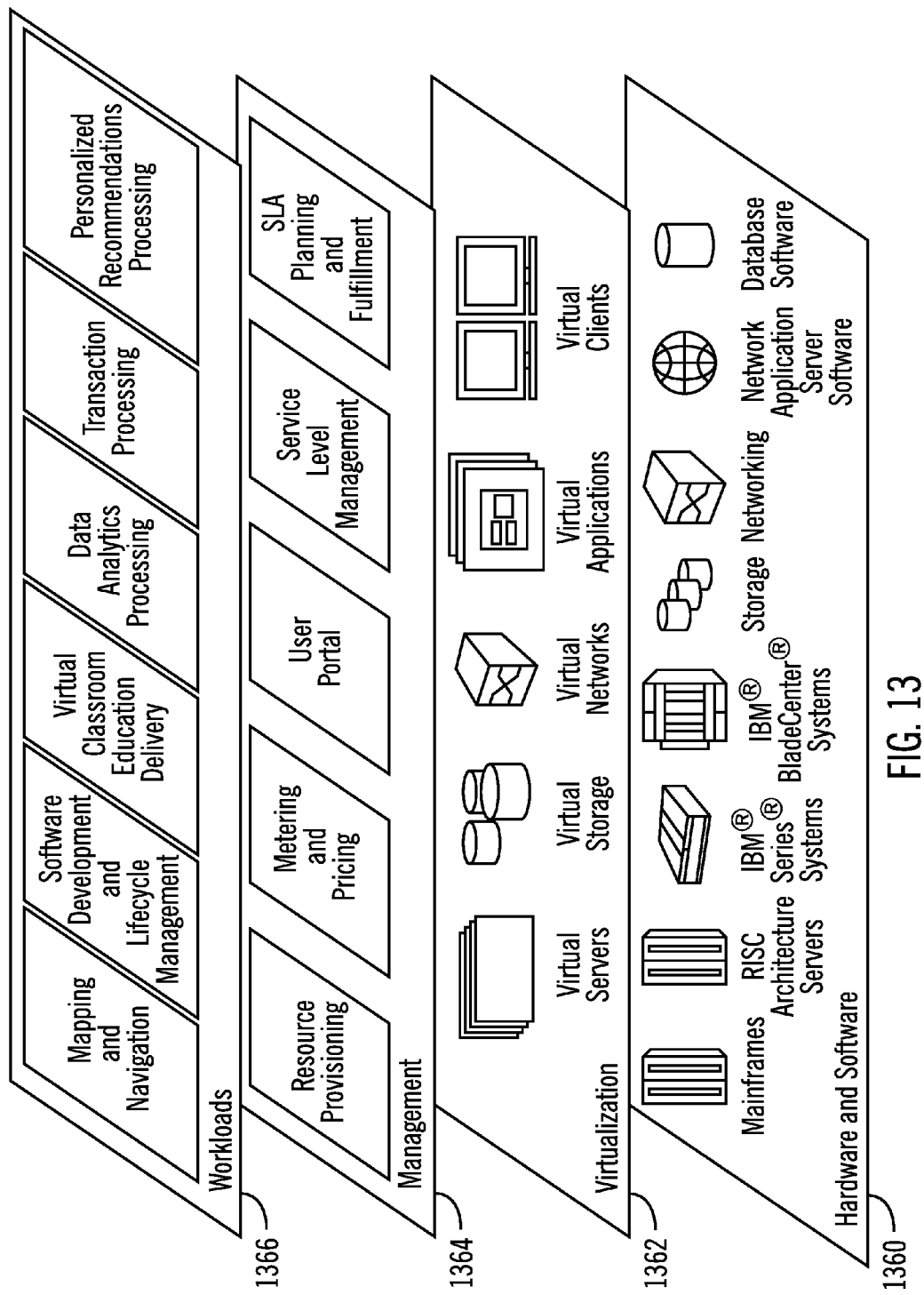
FIG. 13 depicts abstraction model layers in accordance with certain embodiments.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1362 provides an abstraction layer from which the following examples of virtual entities may be provided: virtual servers; virtual storage; virtual networks, including virtual private networks; virtual applications and operating systems; and virtual clients.

In one example, management layer 1364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 1366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and personalized recommendations processing.

Thus, in certain embodiments, software, implementing personalized recommendations processing in accordance with embodiments described herein, is provided as a service in a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for providing personalized recommendations in a cloud infrastructure comprising cloud computing nodes, wherein each of the cloud computing nodes includes one or more processors, comprising:

performing with the one or more processors of a first cloud computing node that includes an analytics and recommendations engine directly coupled to one or more customer interaction channels that are directly coupled to a second cloud computing node that includes a transaction management system, that enable the analytics and recommendations engine and the transaction management system to pass information to each other, that are portals, and that each provide a pathway for a transaction to reach the transaction management system, providing cross-interaction channel analytics by:

receiving first transactions from a first customer interaction channel of the one or more customer interaction channels, wherein the first customer interaction channel is a first portal of the portals;

receiving second transactions from a second customer interaction channel of the customer interaction channels, wherein the second customer interaction channel is a second portal of the portals;

storing the first transactions and the second transactions in an incremental data store;

generating one or more predictive rules based on the stored transactions in the incremental data store;

in real-time, generating one or more personalized recommendations specific to a user using the one or more generated predictive rules; and delivering the one or more personalized recommendations to the transaction management system using the second customer interaction channel of the customer interaction channels for storage in a transaction data store, wherein the one or more personalized recommendations are each one of an offer and an advertisement that is related to the second transactions;

displaying the one or more personalized recommendations to the user; and in response to receiving selection of a personalized recommendation from the one or more personalized recommendations, providing additional personalized recommendations.

2. The method of claim 1, further comprising:
providing one or more rules templates;
receiving input for one or more fields of one of the rules templates;
generating a static rule based on the input; and
storing the static rule.

3. The method of claim 1, further comprising:
providing a user interface to enable creation of rules.

4. The method of claim 1, wherein the one or more personalized recommendations are generated using one or more static rules and the one or more predictive rules.

5. The method of claim 1, wherein the first transactions are being provided to the user in real-time.

6. A system for providing personalized recommendations, comprising:
a cloud infrastructure comprising cloud computing nodes and customer interaction channels, wherein each of the cloud computing nodes includes one or more processors, wherein a first cloud computing node includes an analytics and recommendations engine directly coupled to the customer interaction channels that are directly coupled to a second cloud computing node that includes a transaction management system, wherein the customer interaction channels enable the analytics and recommendations engine and the transaction management system to pass information to each other, are portals, and each provide a pathway for a transaction to reach the transaction management system, and wherein the first cloud computing node includes a storage device connected to at least one processor of the one or more processors, wherein the storage device has stored thereon a program, and wherein the at least one processor is configured to execute instructions of the program to perform operations, wherein the operations comprise providing cross-interaction channel analytics by:

receiving first transactions from a first customer interaction channel of the customer interaction channels, wherein the first customer interaction channel is a first portal of the portals;

receiving second transactions from a second customer interaction channel of the customer interaction channels, wherein the second customer interaction channel is a second portal of the portals;

storing the first transactions and the second transactions in an incremental data store;

generating one or more predictive rules based on the stored transactions in the incremental data store;

in real-time, generating one or more personalized recommendations specific to a user using the one or more generated predictive rules; and delivering the one or more personalized recommendations to the transaction management system using the second customer interaction channel of the customer interaction channels for storage in a transaction data store, wherein the one or more personalized recommendations are each one of an offer and an advertisement that is related to the second transactions;

displaying the one or more personalized recommendations to the user; and in response to receiving selection of a personalized recommendation from the one or more personalized recommendations, providing additional personalized recommendations.

7. The computer system of claim 6, wherein the operations further comprise:
providing one or more rules templates;
receiving input for one or more fields of one of the rules templates;
generating a static rule based on the input; and
storing the static rule.

8. The computer system of claim 6, wherein the operations further comprise:
providing a user interface to enable creation of rules.

9. The computer system of claim 6, wherein the one or more personalized recommendations are generated using one or more static rules and the one or more predictive rules.

10. The computer system of claim 6, wherein the first transactions are being provided to the user in real-time.

11. A computer program product for providing personalized recommendations in a cloud infrastructure comprising cloud computing nodes, wherein each of the cloud computing nodes includes one or more processors, the computer program product comprising:

a first cloud computing node that includes a non-transitory computer readable storage medium having computer readable program code embodied therewith, and that includes an analytics and recommendations engine directly coupled to customer interaction channels that are directly coupled to a second cloud computing node that includes a transaction management system, wherein the customer interaction channels enable the analytics and recommendations engine and the transaction management system to pass information to each other, are portals, and each provide a pathway for a transaction to reach the transaction management system, and wherein the computer readable program code, when executed by the one or more processors of the first cloud computing node, is configured to perform providing cross-interaction channel analytics by:

receiving first transactions from a first customer interaction channel of the customer interaction channels, wherein the first customer interaction channel is a first portal of the portals;

receiving second transactions from a second customer interaction channel of the customer interaction channels, wherein the second customer interaction channel is a second portal of the portals;

storing the first transactions and the second transactions in an incremental data store;

generating one or more predictive rules based on the stored transactions in the incremental data store;

in real-time, generating one or more personalized recommendations specific to a user using the one or more generated predictive rules; and delivering the one or more personalized recommendations to the transaction management system using the second customer interaction channel of the customer interaction channels for storage in a transaction data store, wherein the one or more personalized recommendations are each one of an offer and an advertisement that is related to the second transactions;

displaying the one or more personalized recommendations to the user; and in response to receiving selection of a personalized recommendation from the one or more personalized recommendations, providing additional personalized recommendations.

12. The computer program product of claim 11, wherein the computer readable program code, when executed by the processor of the computer, is configured to perform:
   providing one or more rules templates;
   receiving input for one or more fields of one of the rules templates;
   generating a static rule based on the input; and
   storing the static rule.

13. The computer program product of claim 11, wherein the computer readable program code, when executed by the processor of the computer, is configured to perform:
   providing a user interface to enable creation of rules.

14. The computer program product of claim 11, wherein the one or more personalized recommendations are generated using one or more static rules and the one or more predictive rules.

15. The computer program product of claim 11, wherein the first transactions are being provided to the user in real-time.

* * * * *